Figure 7:
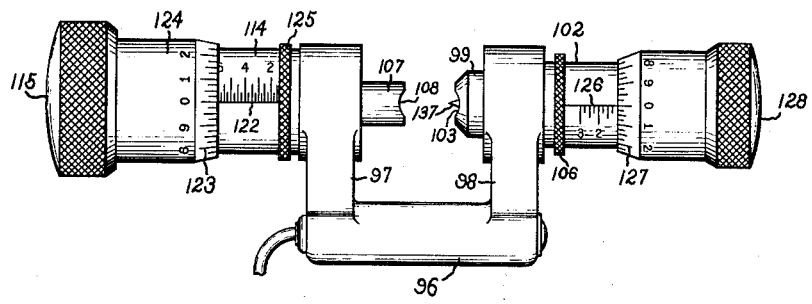

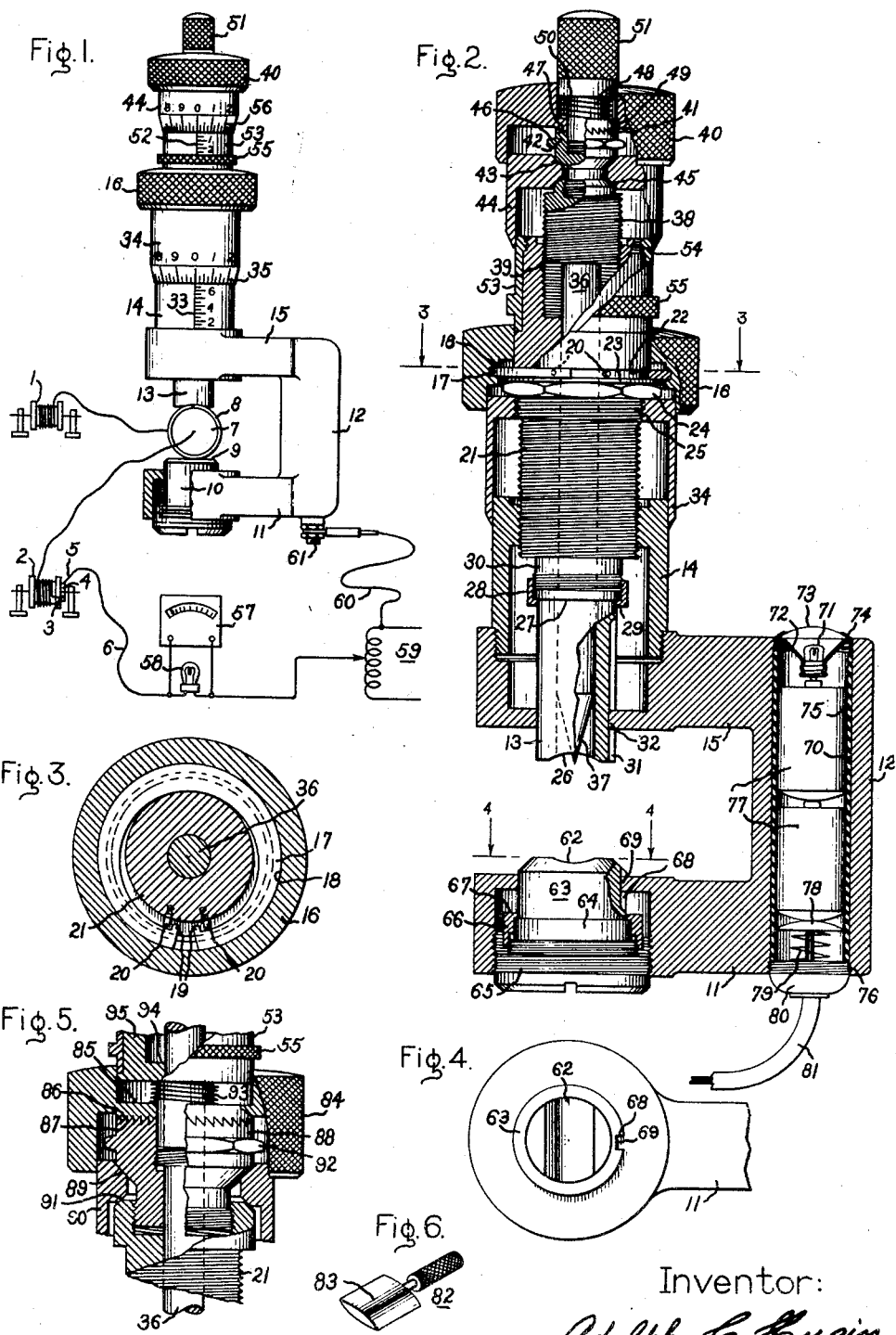

March 20, 1951  A. C. HUGIN  2,545,782
MICROMETRIC INSULATION TESTER
Filed Jan. 12, 1948  2 Sheets-Sheet 2

Inventor:
Adolph C. Hugin

Patented Mar. 20, 1951

2,545,782

UNITED STATES PATENT OFFICE 2,545,782

MICROMETRIC INSULATION TESTER

Adolph C. Hugin, Washington, D. C.

Application January 12, 1948, Serial No. 1,710

22 Claims. (Cl. 33—143)

My invention relates to measuring instruments and systems and particularly to an instrument of the micrometer type for measuring the thickness of electrically conductive insulated material and the thickness or depth of the insulation on such material.

In the manufacture of electrically conductive insulated material, it is necessary that the thickness of the insulated material be checked and also that the depth of the insulation on the material be determined in order to assure the manufacture of material which will conform to the specifications to which it is being made. This is particularly necessary in the manufacture of insulated electrical conductors in which the insulation comprises a thin insulating coating which is hardened on the conductor. Insulation of this type may include various varnishes, enamels, and vitreous coatings, and the above-mentioned tests often are made by an inspector who measures the external diameter of the insulated conductor and then removes the insulating coating on a part of the wire to be checked by rubbing off the insulation with a suitable abrasive, such as emery cloth, and then measures the diameter of the conductor from which the insulation has been removed. The difference in the diameter of the conductor before the insulation is removed and after the insulation has been removed is taken to be twice the thickness of the insulation on the wire. This introduces inaccuracies in the determination of the insulation thickness, as it is not possible to remove all of the insulation from a conductor by such a method without removing a certain amount of the conductive material. Furthermore, the conductor from which the insulation has been removed no longer is usable unless the conductor be reinsulated over the portion from which the insulation was removed for check purposes. This also is not desirable, as it may produce a non-uniformity of insulation over this part of the conductor.

An object of my invention is to provide a measuring instrument which is adapted to be used to determine the thickness or diameter of an insulated electrical conductor and also to determine directly the thickness or depth of insulation around the conductor substantially without impairment or variation in the uniformity of the insulated conductor.

Another object of my invention is to provide a measuring instrument and system which may be used to determine the diameter of an insulated wire and the thickness or depth of the insulation on the wire and to provide a readily perceivable signal to the user of the instrument to assure the proper use thereof for obtaining accurate measurements.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 8:
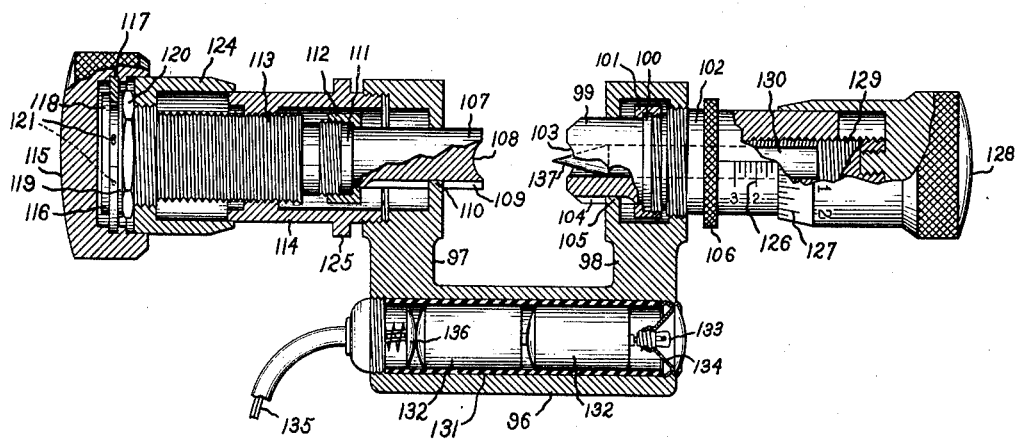

In the drawing, Fig. 1 illustrates an embodiment of my invention in which the instrument is partly broken away and its system is partially schematically illustrated; Fig. 2 is a side elevational view, partly broken away to illustrate another embodiment of my invention in which the instrument includes the major parts of the system shown as separate members in the system of Fig. 1; Fig. 3 is a sectional view taken along line 3—3 of Fig. 2; Fig. 4 is a view taken along line 4—4 of Fig. 2; Fig. 5 is a side elevational view, partly broken away, of another embodiment of the slip clutch shown in detail in Figs. 2 and 3 and which may be utilized in any of the embodiments of this invention; Fig. 6 is a perspective view of a check gauge which may be used for checking the measuring scale of an instrument such as that shown in Fig. 2; Fig. 7 is a side elevational view of another embodiment of my invention; and Fig. 8 is a view partially in section of the device shown in Fig. 7 illustrating the internal details thereof.

Referring to the drawing, I have shown similar type micrometer instruments in Figs. 1 and 2 and the basic measuring elements are substantially the same in the constructions shown in both these figures. Variations in certain parts have been made which may be found desirable in some instances to increase the accuracy of the instrument or which may be found desirable to simplify the various elements. The sectional view shown in Fig. 2 may be considered as illustrating the detail internal construction of the extensibly mounted measuring elements of the micrometer which include the scales of the instrument and may be essentially the same in Figs. 1 and 2, and similar references on the various figures of the drawing refer to the same elements.

In measuring the thickness or diameter of an insulated electrical conductor, the instrument will be found particularly useful in checking the insulation thickness where such material is being manufactured, and it is desirable to maintain it within certain predetermined specifications. During such a process, the conductor is usually transferred from a reel to the insulating equipment and when the insulation, such as insulating enamel, has been applied and suitably hardened on the conductor, the insulated material is rewound on another reel. Since such conductors usually are very long, it is desirable to check the thickness of the insulation at intervals during the manufacture without interrupting the process. In Fig. 1, I have schematically illustrated the uninsulated conductor as wound around a reel 1 from which it passes through suitable insulating equipment and then the insulated conductor is wound on another reel 2. In using my improved checking arrangement, I provide for a suitable signal to the inspector when the measurement is completed and utilize the conductor which is under inspection as part of the signaling circuit. To do this, the end 3 of the insulated conductor on the reel 2 is electrically connected to a suitable electrical connecting device, such as a slip ring 4, mounted on the reel 2 and rotatable therewith, with which electrical contact is made by any suitable means, as by a copper or other brush 5 connected to an electrical conductor 6 of the measuring system.

The insulated conductor is shown in the micrometer and includes an electrically conductive material portion 7 to which suitable insulating material 8 has been applied as a substantially uniform external coating. In order to determine the total external diameter of the insulated conductor, its diameter is measured between a substantially flat face 9 of an anvil 10 of the micrometer which is adjustably mounted by screw-threaded engagement in an arm 11 of a frame 12 and a hollow measuring piston member 13 which is extensibly threadedly mounted in the frame by a screw-threaded engagement with a sleeve 14 secured to the frame 12 in any suitable manner, as by a screw-threaded engagement with an arm 15 of the frame. In order to assure uniform pressure between the face 9 of the anvil 10 and the adjacent end of the measuring piston member 13 on the insulated electrical conductor, the measuring piston is adapted to be biased into engagement with the insulated electrical conductor through a piston operating member which includes a knurled ring member 16 operatively connected to the piston measuring member by any suitable preloaded slip clutch constructed so that the operating ring member 16 will slip when the resistance to movement of the piston member exceeds a predetermined value. This slip clutch may be made as shown in Fig. 2 or include an arrangement such as that shown in Fig. 5. In a construction such as that shown in Fig. 2, the piston operating ring member 16 is operatively connected to the measuring piston member through a preloaded slip spring clutch which includes an arcuate spring 17 formed of a radial thickness which varies directly with the distance from the midpoint of the spring towards each end thereof such that the external circumference of the spring 17 maintains a cylindrical contour for a wide variation in diameter, thus assuring uniform contact with the inner cylindrical surface of a spring seating groove 18 formed in the operating ring member 16. Such springs are commercially available and are preferred for this type spring slip clutch, as the loading at which the clutch will slip may be more accurately determined. However, a more conventional circular or arcuate spring of substantially uniform depth or thickness may be utilized if desired. Each end of the spring 17 is formed with an inwardly extending finger 19 in order to provide a driving connection between the spring 17 and pins 20 which are secured in the upper threaded portion 21 of the hollow measuring piston member 13. The spring is held in position on the hollow measuring piston member by engagement with a shoulder 22 formed on the upper end 21 of the measuring piston member and by a washer 23 arranged on the opposite side thereof and held in position by a suitable retaining nut 24 which is threadedly secured on a shoulder 25 formed on the upper threaded portion 21 of the measuring piston member.

The end of the measuring piston member adjacent the anvil 9 is formed with a centrally concave cylindrically grooved measuring face 26 which is adapted to engage the adjacent surface of an electrical conductor under measurement and inherently to center the conductor relatively to the measuring piston by reason of the contour of the grooved face. Since the cylindrically grooved measuring face 26 is adapted to engage the cylindrical surface of the conductor under measurement, it is necessary that this portion of the measuring piston member be extensibly adjustable relative to the frame and that the grooved face 26 be maintained in the same position for all positions of the measuring piston, that is, the grooved face 26 must not be allowed to rotate with the measuring piston member as it is turned by the operating ring member 16. This operation is obtained by forming the lower end of the measuring piston member 13 as a separate element having a head 27 which is secured to the lower end of the upper threaded portion 21 of the measuring piston in rotatable relation thereto in any suitable manner. As shown in Fig. 2, this may be done by securing the head 27 against the lower end of the measuring piston member portion 21 by a cap 28 having an inwardly extending flange 29 which extends around a part of the head 27. The cap 28 is secured to the upper measuring piston member portion 21 by screw-threaded engagement with a reduced diameter shoulder 30 thereon and is drawn up to such a position as to maintain the lower portion 13 of the measuring piston in alignment with the upper portion 21 of the measuring piston but will allow relative rotation between the head 27 and the adjacent end of the upper measuring piston portion 21. Rotation of the lower portion measuring piston is prevented by forming this portion of the piston with a keyway 31 arranged in engagement with a projecting key 32 formed on the frame arm 15, such that the lower portion of the measuring piston will always be maintained in the same relative longitudinal position with respect to the frame and will be held against rotation relative to the insulated conductor under measurement while permitting free extensible movement thereof.

In order to indicate the external diameter of the insulated conductor, the sleeve 14 is formed with a measuring scale 33 on which suitable linear measurements are indicated, and the first of these indications corresponds to the distance from a cord across the plane surface of the face of the measuring piston member 13 to the center of the arc of the cylindrically grooved measuring face 26. In Fig. 1, this is shown as equivalent to one of the measurement divisions. The diameter of the insulated conductor is indicated by an index on a sleeve 34 which is suitably secured to the measuring piston member by screw-threaded engagement with the shoulder 25, and this sleeve 34 is formed with a micrometer scale 35 on the open end thereof for cooperation with the frame measuring scale 33 in the conventional manner.

Specifications for insulated conductors generally include an allowance of a certain number of imperfections in the insulation, such as small uninsulated points in the insulating enamel or other insulating coating on the conductor, and good insulated conductors are formed with a fewer number of these imperfections than are allowable under the specification, such that an occasional additional perforation of the insulation would not be objectionable and would not deleteriously affect the insulating character of the insulating coating. In order to measure the depth or thickness of the insulation on the conductor under measurement, I provide a measuring plunger 36 having a sharply pointed conical end 37 which is extensible through the hollow grooved end face 26 of the measuring piston member adjacent the anvil and extensibly mount this measuring plunger by threaded engagement of an upper threaded end 38 thereof with an internally threaded portion 39 of the measuring piston member. This internally threaded portion 39 of the measuring piston member may be formed integrally with the externally threaded portion 21, as shown in Fig. 2, when a slip clutch such as that shown in Figs. 2 and 3 is utilized to provide the driving connection between the piston operating member 16 and the measuring piston member, or it may be formed as a separate element if a slip clutch such as that shown in Fig. 5 is utilized to provide this driving connection. The measuring plunger is adapted to be operated by an operating ring member 40 which extends around the measuring plunger member and is adapted to be operatively connected thereto by a preloaded slip clutch of any suitable type. In the illustrated arrangement, this slip clutch includes a ratchet mechanism having ratchet teeth 41 formed on the upper end of a connection member 42 which is secured to the measuring plunger 36 by threaded engagement therewith and is formed with a conical surface 43 adapted to engage a complementary conical surface on a sleeve 44 for adjustably securing this sleeve 44 between the conical surface 43 and another conical surface 45 formed on the adjacent end of the plunger member threaded portion 38. The connection member 42 is preferably formed with a collar 46 with flat sides similar to a hexagonal nut to facilitate securing it in position. The ratchet mechanism includes a set of ratchet teeth 47 which are adapted to engage the ratchet teeth 41 to provide a positive drive therewith for retracting the plunger mechanism, as the sides of the ratchet teeth 41 and 47 are substantially axial on the sides through which the operating force is transmitted for retractive movement of the plunger member. The other sides of these teeth are formed at an angle and are biased into engagement with each other by a suitable spring 48 which is arranged under compression between a flange 49 on the operating ring member 40 on which the ratchet teeth 47 are formed and a shoulder 50 on a positive driving head 51 of the measuring plunger 36. The positive driving head 51 is secured in any suitable manner to the plunger 36 and is shown as threaded into the connection member 42. With this construction, the plunger 36 can be extended by turning the operating ring member 40 until a predetermined resistance to further extension movement of the plunger is encountered, after which the ratchet teeth 47 on the operating ring member 40 will slip over the ratchet teeth 41. The thickness of the insulation is determined when the pointed end 37 of the measuring plunger 36 has pierced the insulation and contacts the electrically conductive portion of the conductor. This depth or thickness of the insulation is indicated by a measuring scale 52 on the measuring piston member which is preferably formed on a sleeve 53 which is circumferentially and axially adjustable relative to the measuring piston member to adjust for inaccuracies and wear in the measuring plunger. This sleeve may be secured to the measuring plunger in any suitable manner, as by screw-threaded engagement therewith as shown at 54, and adjustment thereof is facilitated by the provision of the knurled ring 55 formed on the external surface of the sleeve. The distance which the pointed end 37 of the measuring plunger 36 extends beyond the surface of the grooved measuring face 26 indicates the thickness of the insulation and is indicated on a measuring scale by an index on the open end of the sleeve 44 which is secured to the measuring plunger. The open end of the sleeve 44 also preferably is formed with a micrometer scale 56 which cooperates with the measuring scale 52 in the conventional manner to indicate fractions of the scale divisions on the measuring scale 52. As shown in Fig. 1, the measuring scale 52 has progressive linear indications which begin at the upper or outer end of the scale and progress to larger numerical values towards the lower portion of the scale adjacent the knurled ring 55.

In order to indicate when the pointed end 37 of the measuring plunger 36 has pierced the insulating coating on the insulated conductor and contacted the conductive portion of the conductor, I provide an electrical circuit with a circuit-indicating device which will give an indication to the user that the electrical circuit has been completed. As shown in Fig. 1, this may comprise any suitable circuit-indicating signal device, such as a galvanometer 57 and an electric light or buzzer 58, or only one of these separately, connected in circuit with a suitable source of electrical voltage, such as a stepdown transformer 59 of the bell-ringing type. The other side of this transformer is connected by an electrical conductor 60 to a terminal 61 on the micrometer frame 12, such that when the pointed end 37 of the measuring plunger 36 forms an electrical contact with the electrically conductive portion 7 of the insulated conductor, an electric circuit is completed from the transformer 59 through the conductor 60, the terminal 61, the micrometer frame 12, the measuring plunger pointed end 37, to the electrically conductive portion 7 of the conductor under measurement, to the end 3 of this conductor, to the connecting elements 4 and 5, through the conductor 6, to the circuit indicating devices 57 and 58, to the other side of the transformer 59, and provides an indication on the galvanometer 57 and the electric light or buzzer 58 that this circuit has been completed. When the user obtains such an indication, the reading indicated by the measuring scale 52 and the micrometer scale 56 indicates the thickness of the insulation on the conductor under measurement. This provides a direct reading of the diameter of the insulated conductor on the piston measuring scale 33 and its cooperating micrometer scale 35 and a direct reading of the thickness or depth of the insulation on the conductor by the reading on the plunger measuring scale 52 and its cooperating micrometer scale 56.

In certain circumstances, the insulation may be found to offer such resistance to extension of the measuring plunger that the operating ring member 40 will slip before the pointed end 37 has pierced the insulation. Under such conditions, the positive driving head 51 may be utilized to screw the measuring plunger until an indication is provided that the circuit has been completed as described above. It may also be found desirable to adjust the loading at which the slip clutch will slip, and this may be done by adjusting the position of the positive driving head 51 in relation to the flange 49 of the ring operating member 40 by screwing the positive driving head 51 in or out of the connection member 42 to vary the compression of the spring 48 and thereby vary the pressure between the ratchet teeth 41 and 47.

In the construction shown in Fig. 2, the measuring micrometer instrument is constructed for more accurate measurements by the provision of an improved type anvil and by the inclusion of the major portion of the electrical indicating system as an integral part of the instrument. This improved anvil includes a centrally concave cylindrically grooved measuring face 62 which is nonrotatably and adjustably mounted in the frame arm 11. The anvil preferably is formed in two parts with the grooved measuring face 62 formed on a cylindrical member 63 provided with a head 64 which is secured in position on a threaded member 65 by a cap 66 having a flange 67 which extends around the head 64 and is secured to the threaded member 65 by threaded engagement therewith. The cap 66 is drawn up to prevent relative axial and edgewise movement between the cylindrical member 63 and the threaded member 65, and a keyway 68 is formed in the cylindrical member 63 and is adapted to be engaged by a key 69 formed on the frame arm 11 to prevent relative rotary movement therebetween while permitting axial adjustment of the anvil relative to the frame arm 11 while maintaining the cylindrically grooved measuring face 62 in a position with the axis of curvature thereof parallel to the axis of curvature of the cylindrically grooved measuring face 26 of the measuring piston member 13. The provision of the two cooperating grooved measuring faces assures correct centering of cylindrical conductors which may be measured by the instrument which is particularly desirable in order to assure a correct measurement of the thickness of the insulation on such conductors, as if a cylindrical conductor were to be measured in a position other than when correctly centered, the distance which the pointed end 37 of the measuring plunger would extend beyond the grooved measuring face 26 in order to contact the electrically conductive portion of the conductor under measurement would not be an accurate measurement of the insulation thickness.

In this construction, the circuit indicating device and its associated electrical system may be arranged in a compartment 70 in the main measuring micrometer instrument frame 12. These may conveniently take the form of an electrical circuit indicating device, such as a flashlight electric bulb 71 secured in any suitable manner within the compartment 70, as in a flashlight construction. In Fig. 2, the bulb 71 is shown as screwed into a reflector 72 provided with a suitable lens 73 and secured in electrical contact with the compartment 70 by being clamped into position by a screw cap 74 threaded into the end of the frame compartment 70. This compartment 70 is preferably provided with an electrically insulating lining 75 which extends between the screw cap 74 and a threaded portion 76 at the opposite end of the compartment. The compartment 70 may conveniently be utilized as an electric battery compartment in which one or more electric batteries 77 may be arranged to provide a source of electrical voltage for the electrical signalling system. In this arrangement, the storage batteries may be arranged as shown electrically in series with each other and with the central terminal of the electric light bulb 71 and contacted by a suitable terminal contact member 78 biased into good electrical contact with the terminal base of one of the electrical batteries 77 by a suitable compression spring 79 held under compression between the electrical terminal contact 78 and a closure cap 80 of insulating material threadedly mounted in the compartment 70 by engagement with the threaded end 76 thereof. In this construction, the only electrical conductor required to complete the electric circuit between the measuring micrometer instrument and the electrical conductor under measurement includes a conductor 81 which is electrically connected to the terminal contact member 78 and is adapted to form a suitable electrical contact with the end of the conductive portion of the electrical conductor under measurement. This latter connection may be made in a manner similar to that shown in Fig. 1 wherein the end 3 of the electrical conductor is connected by a suitable set of electrical connecting members 4 and 5 to the electrical circuit indicating part of the system. As shown in the drawings, neither the anvil measuring face nor the main piston measuring face, at any time, forms part of the electric signal circuit which is entirely apart from them. This assures against possible pitting of these faces and against possible inaccuracies resulting therefrom.

In this construction, it may be desirable to check the zero position of the measuring and micrometer scales, and this can be facilitated by the utilization of a gauge member 82 shown in Fig. 6 and formed with convex curved surfaces 83 which are formed on the same center of curvature as the cylindrically grooved faces 26 and 62 of the micrometer measuring instrument and are formed with a central thickness corresponding to the initial linear measuring indication given on the measuring scale 33. In order to check the zero position of the measuring scale 33, the gauge 82 is inserted between the grooved measuring faces 26 and 62 and the measuring piston member is screwed down by the operating ring member 16 into firm engagement with the gauge 82 until the slip clutch allows the member 16 to turn without further movement of the measuring piston member. In this position, the zero index on the micrometer scale 35 should be exactly in line with the measuring scale 33 and should be at the base position on this scale adjacent the frame arm 15. If the zero index on the micrometer scale is not in this position, the micrometer scale 35 may be circumferentially adjusted by rotating it relative to the measuring piston member by changing its threaded position thereon.

The measuring plunger zero position may be checked by turning the plunger operating ring member 40 until its slip clutch slips to indicate that the pointed end 37 of the measuring plunger 36 is in engagement with the gauge 82. In this position, the zero index of the micrometer scale 56 should be in line with the measuring scale 52 and should read "zero" on this measuring scale. If the zero index is not in this position under these conditions, it may be adjusted by turning the sleeve 44 relative to the measuring plunger 36, and if a large amount of adjustment is required, the sleeve 53 may be adjusted by turning it on the measuring piston member until the correct zero indication, as explained above, is obtained.

It may be found desirable to provide a slip clutch between the measuring piston operating ring member and the measuring piston member which is similar to that illustrated in Fig. 2 as providing an operative connection between the operating ring member 40 and the measuring plunger member 36. This type slip clutch is illustrated in Fig. 5 and includes a measuring piston operating ring member 84 with a flange 85 having ratchet teeth 86 extending therefrom which are adapted to engage complementary ratchet teeth 87 formed on a connection member 88 which is secured to the threaded portion 21 of the measuring piston member. The connection member 88 is formed with a substantially conical surface 89 which is adapted to engage a complementary conical surface on a sleeve 90 for securing this sleeve in position between the conical surface 89 and a similar oppositely extending conical surface 91 on the adjacent end of the threaded measuring piston member portion 21. The sleeve 90 preferably is formed with an index and a micrometer scale similar to that on sleeve 34 and is adapted to function in the same manner as this sleeve. Adjustment of the position of the sleeve 90 in order to obtain the desired correspondence for the zero position of the index and micrometer scale on this sleeve with reference to the measuring scale 33 is facilitated by the provision of a flange 92 on the connection member 88 which is formed with flat sides similar to a hexagonal nut, such that the connection member 88 may be more easily screwed in and out of the adjacent threaded end of the threaded portion 21 of the measuring piston member. The ratchet teeth 86 and 87 of the slip clutch are biased towards each other in any suitable manner, as by a compression coil spring 93 retained under compression between the operating ring member flange 85 and a flange 94 on the lower portion of an extension 95 of the measuring piston member. This extension 95 functions in the same manner as the upper portion 39 of the measuring member shown in Fig. 2 and is similarly provided with a sleeve 53 with a suitable measuring scale thereon and a knurled ring 55 to facilitate adjustment of the sleeve 53 relative to the measuring piston member extension 95. If desired, the preloading of the slip clutch may be adjusted by varying the position of the flange 94 relative to the flange 85 by screwing the measuring piston extension 95 in or out of the connection member 88.

In Figs. 7 and 8 I have illustrated another embodiment of my invention in which the measuring device is of the self-contained type including the indicating scales and the signal system. The measuring device in this construction is made as a micrometer having a frame 96 formed with arms 97 and 98 for supporting the measuring members adapted to determine the total diameter or thickness of an insulated member and to measure directly the thickness of the insulation of the member under measurement. A hollow anvil 99 is formed by a member having a hollow shank and a head 100 secured by a cap 101 to a threaded sleeve 102 which adjustably mounts the anvil in the frame arm 98 by threaded engagement therewith. Since most of the insulated electrically conductive members to be measured are circular section wires or the like, the anvil preferably is formed with a cylindrically grooved measuring face 103 adapted to engage and center the conductor under measurement relative to the anvil 99. The grooved face 103 is maintained in the desired alignment by provision of a keyway 104 in the shank of the hollow anvil 99 and a key 105 is formed on the frame arm 98 which is adapted to extend into this keyway 104 for preventing relative rotation of the anvil 99 and the frame arm 98, while allowing relative axial adjustment of the anvil in the frame arm. This adjustment is only required when it is found desirable to correct the "zero" reading of the measuring device and is facilitated by the provision of a knurled ring 106 formed as a collar on the anvil sleeve 102 which provides a good gripping surface for turning the sleeve.

A measuring piston member 107 is provided which is axially extensibly mounted in the frame for movement axially relative to the anvil to provide for measurement of the diameter or thickness of the conductor under measurement. This piston member 107 also is provided with a measuring face 108, preferably cylindrically grooved, which is adapted to be maintained in axial alignment with the grooved anvil measuring face 103 by a keyway 109 arranged in engagement with a key 110 formed on the frame arm 97. The measuring piston is formed with a shank and a head 111 which is secured by a cap 112 to a threaded operating stem 113 adapted to be screwed in and out of a calibrated sleeve 114 adjustably secured to and forming part of the frame of the device. The caps 101 and 112 may be staked to the sleeve 102 and stem 113, respectively, to prevent loosening of these parts in use. The measuring piston is adapted to be operated by turning a knurled operating ring or cap 115 arranged over the outer end of the measuring piston stem 113 and preferably operatively connected thereto through any suitable slip clutch. In Fig. 8 this slip clutch is shown as the same type illustrated in Figs. 2 and 3 and comprises an arcuate spring 116, preferably formed with a progressively diminishing width from the center toward each end thereof, similar to the spring shown in Fig. 3, and is compressed into a spring seat formed as a groove 117 in the operating cap 115 to provide a predetermined preloading of the spring. This spring is slipped over the measuring piston so that one side rests against a head 118 on the end of the stem 113 and is held in position with a loose sliding fit by a washer 119 and a nut 120 on the other side thereof from the head 118. A pair of pins 121 are secured to the stem 113 and inturned ends of the spring 116 are arranged between these pins, in the same manner as shown in Fig. 3 for the spring ends 19. This spring slip clutch is adapted to operate like the Figs. 2 and 3 clutch in that turning of the operating ring or cap 115 will turn the measuring piston stem 113 and move the piston 107 axially. If the piston 107 is moved until it engages the anvil 99 or a solid member therebetween, such that the resistance to further movement of the piston exceeds a predetermined value, the spring 116 will slip in its seat 117 and the operating cap 115 will turn without further movement of the measuring piston 107. This assures a uniform pressure between the measuring faces 103 and 108 for all measurements made and provides a uniform accuracy of results.

The external diameter or thickness of the insulated conductor under measurement is adapted to be indicated on a measuring scale 122 by a micrometer scale 123 on a sleeve 124 secured to the piston stem 113. The reading of these scales is of the conventional micrometer type and the initial division is one unit in order to allow for the space between the middle of the grooved faces 103 and 108 when the measuring piston is moved to its "zero" position in engagement with the anvil. If the micrometer scale 123 is moved to the end of the measuring scale 122 and the faces 103 and 108 are not in engagement, the anvil may be adjusted to provide this engagement by turning the knurled ring 106. If the zero of the micrometer scale does not correspond with the measuring scale line for this position, the measuring scale may be turned to obtain this correspondence by turning a knurled ring 125 on the sleeve 114 to provide this adjustment.

The thickness of the insulation on the insulated electrically conductive member under measurement is adapted to be indicated directly on a plunger measuring scale 126 formed on the anvil sleeve 102 by reading in the conventional manner the indication on this scale and a micrometer scale 127 formed on an operating ring or cap 128 which is secured by threaded engagement to a threaded stem 129 of a plunger 130. This plunger is adapted to pierce the insulation of the member under measurement and to give a signal when it contacts the electrically conductive portion of the insulated member to indicate that it has passed through the insulation. In this embodiment, as in the construction shown in Fig. 2, the electric circuit for the plunger signal includes the frame 96 which is formed with an electric battery compartment 131 in which suitable electric batteries 132 are arranged to provide a source of electrical potential adapted to be electrically connected to an electrical signal device, such as a flashlight bulb 133. This bulb is secured in position and electrically connected to the plunger 130 through the metal frame 96 and the anvil sleeve 102 by a socket reflector 134 screwed into the end of the battery compartment 131. An electrical conductor 135 is secured to a terminal 136 which contacts the other end of one of the batteries 132 and is adapted to be electrically connected to the end of the electrical conductor under measurement the same as shown in Fig. 1. In order to damage as little as possible the insulation of the insulated conductor under measurement, the plunger 103 is formed with a sharply pointed end 137 which is adapted to be completely retracted when measuring the external diameter or thickness of the conductor under measurement and to be extended by turning the knurled operating ring or cap 128 until the light bulb 133 lights up, thus giving a signal to stop turning as the pointed end 137 of the measuring plunger 130 has passed through the insulation and has contacted the electrically conductive portion of the conductor being measured. The thickness of the insulation is then read directly on the measuring scale 126 and the micrometer scale 127.

Adjustment of the zero position of the plunger measuring and micrometer scales may be obtained by turning the operating ring or cap 128 relative to the plunger 130. This provides a very compact and self-contained measuring unit which may be preferred to the arrangements shown in Figs. 1 and 2 where both hands may be more advantageously used to turn the operating rings 115 and 128.

Any other suitable type slip clutch construction may be utilized where the various slip clutches have been shown in the measuring micrometer instrument, and those shown in the drawing illustrate embodiments which are considered to provide certain advantages as described above for varying the preloading of these slip clutches for different conductors to be measured.

While I have illustrated and described particular embodiments of my invention, modifications which are within the spirit and scope of my invention may occur to those skilled in the art. I desire it to be understood, therefore, that all such modifications are included in the scope of the claims annexed to and forming a part of this application.

What I claim as new and desire to secure by Letters Patent of the United States is:

1. A measuring device having a frame, an anvil in said frame and having a measuring face, a hollow measuring piston member extensibly mounted in said frame and having a measuring face, means for measuring the gap between said measuring faces of said anvil and said measuring piston member, a measuring plunger having a pointed end extensible through said hollow measuring piston member adjacent said anvil and extensible relative to said measuring piston member, means for indicating the extension of said pointed end of said plunger beyond said measuring face of said measuring piston member, a source of electrical voltage, an electrical signal device, and means for electrically connecting in an electric circuit the conductive portion of an insulated electrically conductive member under measurement with said electric signal device and said plunger and said source of electrical voltage for completing an electric circuit through said plunger and said electrical signal device on contact of the conductive portion of the insulated electrically conductive member by said pointed end of said plunger extending through the insulation of the member under measurement.

2. A measuring device having a frame with an anvil having a measuring face, a hollow measuring piston member extensibly mounted in said frame and having a measuring face, means for measuring the gap between the said measuring faces of said anvil and said measuring piston member, a measuring plunger having a pointed end extensible through said hollow measuring piston member measuring face and extensible relative to said measuring piston member, means for indicating the extension of the pointed end of said plunger beyond said measuring face of said measuring piston member, an electric battery compartment in said frame, an electric battery in said battery compartment providing a source of electrical voltage, an electric signal device, and means apart from said measuring faces for electrically connecting in an electric circuit the conductive portion of an insulated electrically conductive member under measurement with said electric signal device and said plunger and said source of electrical voltage for completing an electric circuit through said plunger and said electric signal device on contact of the conductive portion of the insulated electrically conductive member by said pointed end of said plunger extending through the insulation of the member under measurement.

3. A micrometer having a frame, an anvil mounted in said frame and having a measuring face, a hollow measuring piston member extensibly mounted in said frame and having a measuring face, means for measuring the gap between said measuring faces of said anvil and said measuring piston member, a measuring plunger having a pointed end extensible through said hollow measuring piston member measuring face, means for indicating the extension of the pointed end of said plunger beyond said measuring face of said measuring piston member, an electric battery compartment in said frame, an electric battery in said battery compartment providing a source of electrical voltage, an electric light mounted in said frame, and means apart from said measuring faces for electrically connecting in an electric circuit the conductive portion of an insulated electrically conductive member under measurement with said electric light and said plunger and said source of electrical voltage for completing an electric circuit through said plunger and said electric light on contact of the conductive portion of the insulated electrically conductive member by said pointed end of said plunger extending through the insulation of the member under measurement.

4. A measuring instrument having a frame with an anvil having a centrally cylindrically grooved face, a hollow piston member extensibly mounted in said frame and having a centrally cylindrically grooved face nonrotatably movable axially relative to said anvil, means for measuring the gap between diametrically opposite points on the adjacent faces of said anvil and said measuring piston member, a measuring plunger having a pointed end extensible through said measuring piston member adjacent said anvil and extensibly mounted in said measuring piston member, means for indicating the extension of the pointed end of said plunger beyond the end of said measuring piston member adjacent said anvil, an electric battery compartment in said frame, an electric battery in said battery compartment providing a source of electrical voltage, an electric light mounted in said frame, and means apart from said measuring faces for electrically connecting in an electric circuit the conductive portion of an insulated electrically conductive member under measurement with said electric light and said measuring plunger and said source of electrical voltage for completing an electric circuit through said measuring plunger and said electric light on contact of the conductive portion of the insulated electrically conductive member by said pointed end of said plunger extending through the insulation thereby indicating the thickness of the insulation by said plunger extension indicating means.

5. A measuring instrument having a frame, an anvil mounted in said frame, a hollow piston measuring member extensibly mounted in said frame, a measuring scale, means on said piston member including a scale for cooperating with said measuring scale for measuring the gap between said anvil and said measuring piston member, a measuring plunger having a pointed end extensible through said measuring piston member adjacent said anvil, a measuring scale on said measuring piston member, means on said measuring plunger for cooperating with said latter measuring scale to indicate the extension of the pointed end of said plunger beyond the end of said measuring piston member, a source of electrical voltage, an electric circuit indicating device, means for electrically connecting in an electric circuit the conductive portion of an insulated electrically conductive member under measurement with said electric circuit indicating device and said measuring plunger and said source of electrical voltage for completing an electric circuit through said measuring plunger and said circuit indicating device on contact of the conductive portion of the insulated electrically conductive member by said pointed end of said plunger extending through the insulation thereof.

6. A micrometer having a frame, an anvil mounted in said frame, a hollow piston measuring member extensibly threadedly mounted in said frame, a piston operating member, a measuring scale, means on said piston member extending around said measuring scale and having an index and micrometer scale for cooperating with said measuring scale for measuring the gap between said anvil and said measuring piston member, a measuring plunger having a pointed end extensible through said measuring piston member adjacent said anvil, an operating member for said measuring plunger, a measuring scale on said measuring piston member, means on said measuring plunger having an index and micrometer scale for cooperating with said piston measuring scale to indicate the extension of the pointed end of said plunger beyond the end of said measuring piston member adjacent said anvil, a source of electrical voltage, an electric circuit indicating device, means for electrically connecting in an electric circuit the conductive portion of an insulated electrically conductive member under measurement with said electric circuit indicating device and said measuring plunger and said source of electrical voltage for completing an electric circuit through said measuring plunger and said circuit indicating device on contact of the conductive portion of the insulated electrically conductive member by said pointed end of said plunger extending through the insulation thereof.

7. A micrometer having a frame, an anvil mounted in said frame, a hollow measuring piston member extensibly mounted in said frame, a piston member operating member, means including a measuring scale and an index and micrometer scale on said piston member for cooperating with said measuring scale for measuring the gap between the adjacent faces of said anvil and said measuring piston member, a measuring plunger having a pointed end extensible through said measuring piston member adjacent said anvil and extensibly mounted in said measuring piston member, an operating member for said measuring plunger, means including a measuring scale and an index and micrometer scale on the open end thereof for cooperating with said latter measuring scale for indicating the extension of the pointed end of said plunger beyond the end of said measuring piston member adjacent said anvil, an electric battery compartment in said frame, an electric battery in said battery compartment providing a source of electrical voltage, an electric light mounted in said frame, and means apart from said measuring faces for electrically connecting in an electric circuit the conductive portion of an insulated electrically conductive member under measurement with said electric light and said micrometer plunger and said source of electrical voltage for completing an electric circuit through said micrometer plunger and said electric light on contact of the conductive portion of the insulated electrically conductive member by said pointed end of said plunger extending through the insulation.

8. A micrometer having a frame, an anvil mounted in said frame, a hollow measuring piston member extensibly threadedly mounted in said frame and having a face movable axially relative to said anvil, a piston member operating member, means including a preloaded slip clutch for operatively connecting said piston operating member to said measuring piston member below a predetermined resistance to movement of said piston member, means including a measuring scale and an index and micrometer scale on said piston member for cooperating with said measuring scale for measuring the gap between adjacent faces of said anvil and said measuring piston member, a measuring plunger having a pointed end extensible through said measuring piston member adjacent said anvil and extensibly threadedly mounted in said measuring piston member, an operating member for said measuring plunger, means including a preloaded slip clutch for operatively connecting said plunger operating member to said measuring plunger below a predetermined resistance to extension movement of said plunger, means including a measuring scale and an index and micrometer scale for cooperating with said latter measuring scale to indicate the extension of the pointed end of said plunger beyond the end of said measuring piston member adjacent said anvil, an electric battery compartment in said frame, an electric battery in said battery compartment providing a source of electrical voltage, an electric light mounted in said frame, and means apart from said measuring faces for electrically connecting in an electric circuit the conductive portion of an insulated electrically conductive member under measurement with said electric light and said micrometer plunger and said source of electrical voltage for completing an electric circuit through said micrometer plunger and said electric light on contact of the conductive portion of the insulated electrically conductive member by said pointed end of said plunger extending through the insulation.

9. A micrometer having a frame, an anvil adjustably mounted in said frame, a hollow piston measuring member extensibly mounted in said frame, a piston operating member, means including a preloaded slip clutch for operatively connecting said piston operating member to said measuring piston member below a predetermined resistance to movement of said piston measuring member, a measuring scale, means on said piston member having an index and micrometer scale for cooperating with said measuring scale for measuring the gap between said anvil and said measuring piston member, a measuring plunger having a pointed end extensible through said measuring piston member adjacent said anvil and extensibly mounted in said measuring piston member, an operating member for said measuring plunger, means including a preloaded slip clutch for operatively connecting said plunger operating member to said measuring plunger below a predetermined resistance to movement of said plunger, a measuring scale on said measuring piston member, means on said measuring plunger having an index and micrometer scale for cooperating with said piston scale to indicate the extension of the pointed end of said plunger beyond the end of said measuring piston member adjacent said anvil, a positive driving head on said plunger extending through and beyond said plunger operating member, a source of electrical voltage, an electric circuit indicating device, means for electrically connecting in an electric circuit the conductive portion of an insulated electrically conductive member under measurement with said electric circuit indicating device and said measuring plunger and said source of electrical voltage for completing an electric circuit through said measuring plunger and said circuit indicating device on contact of the conductive portion of the insulated electrically conductive member by said pointed end of said plunger extending through the insulation thereof.

10. A micrometer having a frame, an anvil having a centrally cylindrically grooved face nonrotatably and adjustably mounted by screw-threaded engagement in said frame, a hollow measuring piston member extensibly threadedly mounted in said frame and having a centrally cylindrically grooved face nonrotatably movable axially relative to said anvil, a piston operating member, means for measuring the gap between diametrically opposite points on the adjacent faces of said anvil and said measuring piston member, a measuring plunger having a pointed end extensible through said measuring piston member adjacent said anvil and extensibly mounted in said measuring piston member, an operating member for said measuring plunger, means for indicating the extension of the pointed end of said plunger beyond the anvil end of said measuring piston member, an electric battery compartment in said frame, an electric battery in said battery compartment providing a source of electrical voltage, an electric light mounted in said frame, and means for electrically connecting in an electric circuit the conductive portion of an insulated electrically conductive member under measurement with said electric light and said measuring plunger and said source of electrical voltage for completing an electric circuit through said measuring plunger and said electric light on contact of the conductive portion of the insulated electrically conductive member by said pointed end of said plunger extending through the insulation.

11. A micrometer having a frame, an anvil having a centrally cylindrically grooved face nonrotatably and adjustably mounted by screw-threaded engagement in said frame, a hollow measuring piston member extensibly threadedly mounted in said frame and having a centrally cylindrically grooved face nonrotatably movable axially relative to said anvil, a piston operating member, a measuring scale on said frame, means including a sleeve on said piston member extending around said frame measuring scale and having an index and micrometer scale on the open end thereof for cooperating with said frame measuring scale for measuring the gap between diametrically opposite points on the adjacent faces of said anvil and said measuring piston member, a measuring plunger having a pointed end extensible through said measuring piston member adjacent said anvil and extensibly mounted in said measuring piston member, an operating member for said measuring plunger, an axially extending adjustably mounted measuring scale sleeve on said measuring piston member on a portion thereof extending beyond said piston operating member toward said plunger operating member, a sleeve on said measuring plunger extending around said measuring piston scale sleeve and having a circumferentially adjustable index and micrometer scale on the open end thereof for cooperation with said piston measuring scale to indicate the extension of the pointed end of said plunger beyond the end of said measuring piston member adjacent said anvil.

12. A micrometer having a frame, an anvil having a face adjustably mounted by screw-threaded engagement in said frame, a hollow piston measuring member extensibly mounted in said frame and having a centrally cylindrically grooved face nonrotatably movable axially relative to said anvil, a measuring scale on said frame, means including a sleeve on said piston member extending around said frame measuring scale and having an index and micrometer scale on the open end thereof for cooperating with said frame measuring scale for measuring the gap between the adjacent faces of said anvil and said measuring piston member, a measuring plunger having a sharply pointed conical end extensible through the hollow end face of said measuring piston member adjacent said anvil and extensibly threadedly mounted in said measuring piston member, an axially extending adjustably mounted measuring scale sleeve on said measuring piston member on a portion thereof, means including a sleeve on said measuring plunger extending around said measuring piston scale sleeve and having an index and micrometer scale on the open end thereof for cooperating with said piston scale to indicate the extension of the pointed anvil end of said plunger beyond the anvil end of said measuring piston member, a source of electrical voltage, an electric circuit indicating device, means for electrically connecting the conductive portion of an insulated electrically conductive member under measurement in an electric circuit with said electric circuit indicating device and said micrometer and said source of electrical voltage for completing an electric circuit through said micrometer and said circuit indicating device on contact of the conductive portion of the insulated electrically conductive member by said pointed end of said plunger extending through the insulation thereof.

13. A micrometer having a frame, an anvil having a face adjustably mounted by screw-threaded engagement in said frame, a hollow measuring piston member extensibly mounted in said frame and having a face movable axially relative to said anvil, a measuring scale on said frame, means including a sleeve on said piston member extending around said frame measuring scale and having an index and micrometer scale on the open end thereof for cooperating with said frame measuring scale for measuring the gap between the adjacent faces of said anvil and said measuring piston member, a measuring plunger having a sharply pointed conical end extensible through the hollow end face of said measuring piston member adjacent said anvil and extensibly mounted in said measuring piston member, an axially extending scale on said measuring piston member on a portion thereof, a sleeve on said measuring plunger extending around said measuring piston scale and having an index and micrometer scale on the open end thereof for cooperating with said latter measuring scale for indicating the extension of the pointed end of said plunger beyond the end of said measuring piston member adjacent said anvil, an electric battery compartment in said frame, an electric battery in said battery compartment providing a source of electrical voltage, an electric circuit indicating device, and means for electrically connecting the conductive portion of an insulated electrically conductive member under measurement in an electric circuit with said electric circuit indicating device and said micrometer and said source of electrical voltage for completing an electric circuit through said micrometer and said circuit indicating device on contact of the conductive portion of the insulated electrically conductive member by said pointed end of said plunger extending through the insulation thereby indicating the thickness of the insulation by said plunger index on said piston measuring scale and said plunger micrometer scales associated therewith.

14. A micrometer having a frame, an anvil having a centrally cylindrically grooved face nonrotatably and adjustably mounted by screw-threaded engagement in said frame, a hollow measuring piston member extensibly mounted in said frame and having a centrally cylindrically grooved face nonrotatably movable axially relative to said anvil, a piston operating member, means including a preloaded slip clutch for operatively connecting said piston operating member to said measuring piston member below a predetermined resistance to movement of said piston member, a measuring scale on said frame, means including a sleeve on said piston member extending around said frame measuring scale and having an index and micrometer scale on the open end thereof for cooperating with said frame measuring scale for measuring the gap between diametrically opposite points on adjacent faces of said anvil and said measuring piston member, a measuring plunger having a pointed end extensible through said measuring piston member adjacent said anvil and extensibly mounted in said measuring piston member, an operating member for said measuring plunger, means including a preloaded slip clutch for operatively connecting said latter operating member to said measuring plunger below a predetermined resistance to extension movement of said plunger, means including a ratchet mechanism in said latter slip clutch providing for a positive retractive movement connection between said latter operating member and said measuring plunger, means for adjusting the preloading of said plunger operating slip clutch for adjusting the resistance to movement of said plunger at which said latter slip clutch will slip, an axially extending adjustably mounted measuring scale sleeve on said measuring piston member on a portion thereof extending beyond said piston operating member toward said plunger operating member, a sleeve on said measuring plunger extending around said measuring piston scale sleeve and having a circumferentially adjustable index and micrometer scale on the open end thereof for cooperating with said piston measuring scale to indicate the extension of the pointed end of said plunger beyond the end of said measuring piston member adjacent said anvil.

15. A micrometer having a frame, an anvil having a centrally concave cylindrically grooved face nonrotatably and adjustably mounted by screw-threaded engagement in said frame, a measuring piston member extensibly threadedly mounted in said frame and having a centrally concave cylindrically grooved face nonrotatably movable axially relative to said anvil, a piston member operating ring member, means including a preloaded slip clutch for operatively connecting said measuring ring member to said measuring piston member below a predetermined resistance to movement of said piston member, a measuring scale on said frame, means including a sleeve on said piston member extending around said frame measuring scale and having an index and micrometer scale on the open end thereof for cooperating with said frame measuring scale for measuring the gap between the adjacent faces of said anvil and said measuring piston member, a measuring plunger having a sharply pointed conical end extensible through said face of said anvil adjacent said measuring piston member and extensibly threadedly mounted in said anvil, an axially extending adjustably mounted measuring scale sleeve on said anvil, a sleeve on said measuring plunger extending around said anvil scale sleeve and having a circumferentially adjustable index and micrometer scale on the open end thereof for cooperating with said anvil scale to indicate the extension of the pointed end of said plunger beyond said anvil, a positive driving head on said plunger, an electric battery compartment in said frame, an electric battery in said battery compartment providing a source of electrical voltage, an electric circuit indicating device, and means for electrically connecting the conductive portion of an insulated electrically conductive member under measurement in an electric circuit with said electric circuit indicating device and said micrometer and said source of electrical voltage for completing an electric circuit through said micrometer and said circuit indicating device on contact of the conductive portion of the insulated electrically conductive member by said pointed end of said plunger extending through the insulation thereby indicating the thickness of the insulation by said plunger sleeve index on said anvil measuring scale and said plunger micrometer scale associated therewith.

16. A measuring instrument having a frame, an anvil in said frame and having a measuring face, a hollow measuring piston member extensibly mounted in said frame and having a measuring face, means for measuring the gap between said measuring faces of said anvil and said measuring piston member, means including one of said measuring faces having a central groove therein of a contour for centering an object on said one face, a measuring plunger having a pointed end extensible through said hollow measuring piston measuring face and extensible relative to said measuring piston member, and means for indicating the extension of said pointed end of said plunger beyond said measuring face of said measuring piston member.

17. A measuring device having a frame, an anvil in said frame and having a centrally cylindrically grooved measuring face, a hollow measuring piston member extensibly mounted in said frame and having a centrally cylindrically grooved nonrotatable measuring face, means for measuring the gap between said measuring faces of said anvil and said measuring piston member, a measuring plunger having a pointed end extensible through said hollow measuring piston member face and extensible relative to said measuring piston member, means for indicating the extension of said pointed end of said plunger beyond said measuring face of said measuring piston member, and means for indicating contact of the conductive portion of an insulated electrically conductive member under measurement by said pointed end of said plunger extending through the insulation of the member under measurement.

18. A measuring device having a frame, an anvil in said frame and having a measuring face, a hollow measuring piston member extensibly mounted in said frame and having a measuring face, at least one of said measuring faces being centrally cylindrically grooved and nonrotatable, means for measuring the gap between said measuring faces of said anvil and said measuring piston member, a measuring plunger having a pointed end extensible through said hollow measuring piston member measuring face and extensible relative to said measuring piston member, means for indicating the extension of said pointed end of said plunger beyond said measuring face of said measuring piston member, and electrical means for indicating contact of the conductive portion of an insulated electrically conductive member under measurement by said pointed end of said plunger extending through the insulation of the member under measurement.

19. A measuring device having a frame, an anvil having a measuring face, a measuring piston member extensibly mounted in said frame and having a measuring face, means including one of said measuring faces having a central groove therein of a contour for centering an object on said one face, means for measuring the gap between said measuring faces of said anvil and said measuring piston member, a measuring plunger having a sharply pointed end extensible through one of said faces toward the other of said faces, and means for indicating the extension of said pointed end of said plunger beyond said one face through which said end is extensible.

20. A measuring device having a frame, an anvil having a measuring face, a measuring piston member extensibly mounted in said frame and having a measuring face, at least one of said measuring faces being centrally cylindrically grooved and nonrotatable, means for measuring the gap between said measuring faces of said anvil and said measuring piston member, a measuring plunger having a sharply pointed end extensible through one of said faces toward the other of said faces, means for indicating the extension of said pointed end of said plunger beyond said one face through which said end is extensible, means for indicating contact of the conductive portion of an insulated electrically conductive member under measurement by said pointed end of said plunger extending through the insulation of the member under measurement.

21. A measuring device having a frame, an anvil in said frame having a measuring face, a measuring piston member extensibly mounted in said frame and having a measuring face, means for measuring the gap between said measuring faces of said anvil and said measuring piston member, a measuring plunger having a sharply pointed end extensible through one of said faces toward the other of said faces, means for indicating the extension of said pointed end of said plunger beyond said one face through which said end is extensible, a source of electrical potential, an electrical signal device, and means for electrically connecting in an electric circuit the conductive portion of an insulated electrically conductive member under measurement with said electrical signal device and said plunger and said source of electrical potential for completing an electric circuit through said plunger and said electrical signal device on contact of the conductive portion of the insulated electrically conductive member by said pointed end of said plunger extending through the insulation of the member under measurement.

22. A measuring device having a frame, a hollow anvil adjustably mounted in said frame and having a measuring face, a measuring piston member extensibly mounted in said frame and having a measuring face, means for measuring the gap between said measuring faces of said anvil and said measuring piston member, a measuring plunger having a sharply pointed end extensible through said hollow anvil and said face of said anvil toward said face of said piston, means for indicating the extension of said pointed end of said plunger beyond said anvil face, a source of electrical potential including an electric battery supported by said frame, an electrical signal device, and means for electrically connecting in an electric circuit the conductive portion of an insulated electrically conductive member under measurement with said electrical signal device and said plunger and said electric battery for completing an electric circuit through said plunger and said electrical signal device on contact of the conductive portion of the insulated electrically conductive member by said pointed end of said plunger extending through the insulation of the member under measurement.

ADOLPH C. HUGIN.

REFERENCES CITED

The following references are of record in the file of this patent:

UNITED STATES PATENTS

| Number | Name | Date |
|---|---|---|
| 1,290,921 | Davidson | Jan. 14, 1919 |
| 2,005,887 | Carson | June 25, 1935 |
| 2,136,675 | Danse | Nov. 15, 1938 |

FOREIGN PATENTS

| Number | Country | Date |
|---|---|---|
| 3,763 | France | Sept. 7, 1848 |
| 129,625 | Switzerland | Jan. 2, 1929 |
| 182,583 | Germany | Mar. 19, 1907 |
| 191,267 | Switzerland | Aug. 16, 1937 |
| 571,751 | Germany | Mar. 9, 1933 |